United States Patent

De Sandre

[15] 3,660,825

[45] May 2, 1972

[54] ELECTRONIC COMPUTER

[72] Inventor: Giovanni De Sandre, Sacile, Italy

[73] Assignee: Ing. C. Olivetti & C.S.p.A., Ivrea, Italy

[22] Filed: Feb. 5, 1971

[21] Appl. No.: 113,060

Related U.S. Application Data

[63] Continuation of Ser. No. 717,110, Mar. 29, 1968, abandoned.

[30] Foreign Application Priority Data

Apr. 1, 1967 Italy ................................ 51164 A/67

[52] U.S. Cl. .......................................................... 340/172.5

[51] Int. Cl. .................... G06f 9/16, G05b 19/22, G06f 15/02

[58] Field of Search ................................................ 340/172.5

[56] References Cited

UNITED STATES PATENTS

| | | | |
|---|---|---|---|
| 3,469,244 | 9/1969 | Perotto et al. | 340/172.5 |
| 3,495,222 | 2/1970 | Perotto et al. | 340/172.5 |
| 3,571,804 | 3/1971 | Hemdal et al | 340/172.5 |

OTHER PUBLICATIONS

IBM 7080 Data Processing System: Reference Manual, IBM Corporation, 1960.
IBM 7080 Programming System: 7058 Processor, System Operation, IBM Corporation, 1960.

*Primary Examiner*—Paul J. Henon
*Assistant Examiner*—Jan E. Rhoads
*Attorney*—Shoemaker & Mattare

[57] ABSTRACT

In a program controlled electronic computer the address of the return point (or main program re-entry storage location) from a program subroutine to the main program is specified by information in a fixed address program storage location, which location is loaded by a special instruction placed in the main program ahead of the branching point. Each subroutine may be contained in an individual record card, which upon being fed into the computer causes said subroutine to be executed.

4 Claims, 8 Drawing Figures

INVENTOR
GIOVANNI DE SANDRE

BY Shoemaker and Mattare
ATTORNEYS

INVENTOR
GIOVANNI DE SANDRE
BY Shoemaker and Mattare
ATTORNEYS

INVENTOR
GIOVANNI DE SANDRE
BY Shoemaker and Mattare
ATTORNEYS

INVENTOR
GIOVANNI DE SANDRE
BY Shoemaker and Mattare
ATTORNEYS

PATENTED MAY 2 1972 3,660,825

SHEET 5 OF 6

INVENTOR
GIOVANNI DE SANDRE

BY Shoemaker and Mattare
ATTORNEYS

INVENTOR
GIOVANNI DE SANDRE
BY Sheinnalerd Mattare
ATTORNEYS

ELECTRONIC COMPUTER

This application is a streamline continuation of application Ser. No. 717,110, filed Mar. 29, 1968, now abandoned, and entitled ELECTRONIC COMPUTER.

BACKGROUND OF THE INVENTION

The present invention relates to an electronic computer. More particularly, it relates to an electronic computer with a program recorded in a store and adapted to interrupt the execution of a main program to proceed to the execution of a predetermined subprogram or subroutine under the control of an instruction to jump to the subprogram which is recorded in the main program at an instruction storage location called the point of interruption, and adapted to resume the execution of said main program under the control of an end-of-subprogram instruction recorded at the end of said subprogram, whereby the execution of said main program is resumed from a re-entry point the address which location is indicated by the contents of a fixed address storage location.

It is known that in almost all high-capacity electronic computers it is possible to modify the individual instructions in the course of the execution of a generic program.

In general, such a computer, in addition to a main store in which the numerical data which are to be used in the solution of a problem and the program instructions are stored, an arithmetical device in which the operations are carried out on the numbers transmitted from the main store and a control system which prearranges and controls the working of the machine, also comprises an auxiliary storage device capable of containing a plurality of modifiers or modifying words for the program instructions, and a suitable modifying device, as described, for example, in U.S. Pat. No. 3,012,724.

In the normal functioning of a computer of this type, when a program instruction is extracted from the main store to be transmitted to the control system, it is made to pass through said modifying device, in which it can be modified by the simultaneous application to said modifying device of a modifier originating from said auxiliary storage device.

The arrangement which has just been described, and which is generally referred to as a modifying register, has the principal advantage of giving the computer great programming flexibility, inasmuch as it enables the modification of any instruction of a generic program or subprogram contained in the main store to be effected during the operation of the computer.

In particular, this modifying register permits the repeated utilization of a given subprogram to which the main program returns at several times during its development, inasmuch as it renders possible the repeated modification of that terminal instruction of the subprogram which identifies the storage location at which the execution of the main program is resumed each time; such location will be referred to as the main program re-entry storage location.

More generally, the use of this modifying register makes it possible to obtain indirect addressing of several subprograms, which can therefore be recorded in particular zones of the main store freely selected by the programmer.

However, the application of the modifying register in the case of machines with a dynamic store proves to be extremely complex because of the unavoidable adoption of supplementary counting and addressing devices which are necessary for extracting the instruction to be modified from the correct location and for reintroducing it at the predetermined address after modification.

It should moreover be added that, though the expense occasioned by such technical expedients may be acceptable for electronic computing machines of high performance and considerable capacity, it may prove to be excessive for cheaper versions of these machines.

SUMMARY OF THE INVENTION

These and other drawbacks are obviated by the computer according to the present invention, which is characterized in that the address of said main program re-entry storage location is introduced into said fixed address storage location under the control of a re-entry-prearranging instruction recorded in said main program in front of point of interruption, said point of interruption being the last main program instruction prior to the commencement of subprogram execution.

According to another characteristic of the invention, the computer comprises a device for reading individual cards each containing a subprogram, so that under the control of automatic-addressing means the introduction of a single card into the reading device, said introduction being controlled by the operator, causes the entry of said subprogram in said internal store and its consequent execution.

These and other characteristics of the invention will be better explained by the following description of a constructional form of the electronic computer and of a number of examples of the execution of programs which provide for the use of one or more subprograms, this description being given with reference to the accompanying drawings.

DESCRIPTION OF A PREFERRED EMBODIMENT OF THE INVENTION

Some parts of the electronic computer according to the invention are similar to corresponding parts of the computer described in U.S. Pat. Nos. 3,304,418 3,495,222, and 3,469,244. Only a brief description of these parts and of the stages of operation which involve them will therefore be given here.

GENERAL DESCRIPTION

Figure 1A:
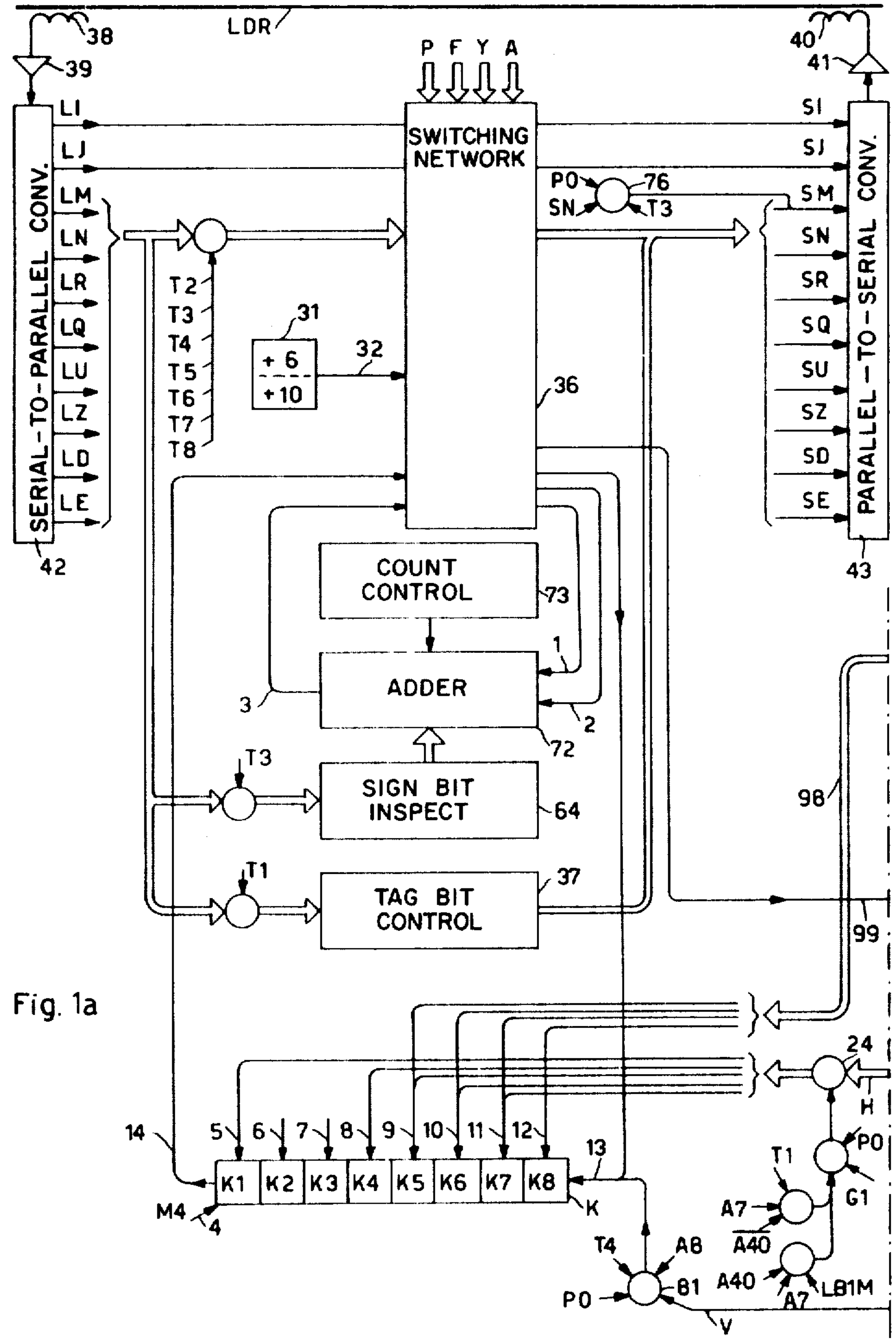
FIGS. 1*a* and 1*b* show a complete block diagram of a constructional form of the computer according to the invention.
Figure 1B:
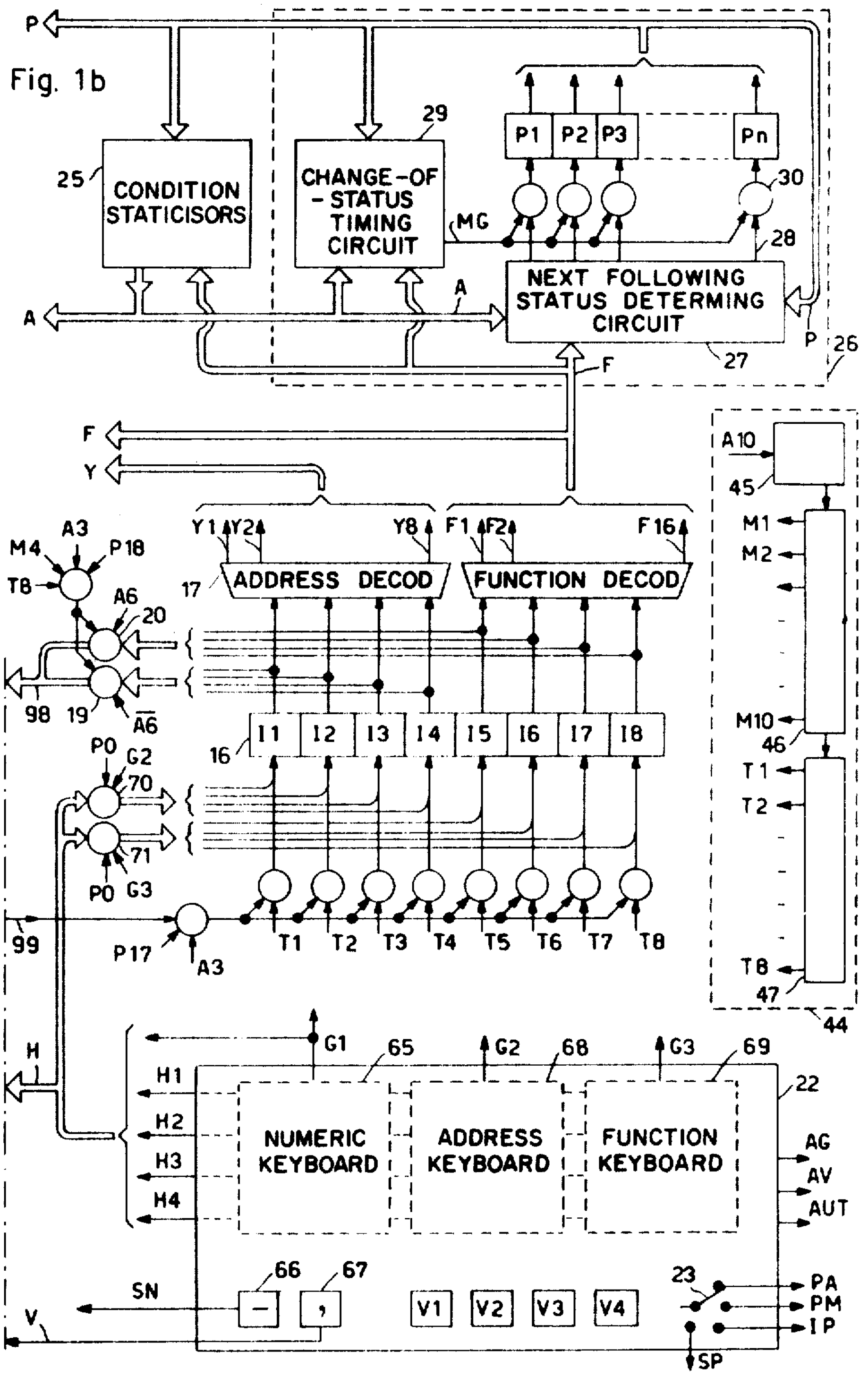

The computer according to the invention comprises (FIGS. 1*a* and 1*b*) a store with a delay line LDR including, for example, 10 registers I,J, M, N, R, Q, U, Z, D, E and provided with a reading transducer 38 feeding a reading amplifier 39 and with a writing transducer 40 fed by a writing amplifier 41.

Each register comprises 30 decimal places (also called storage locations) each having eight binary bit positions, whereby it is adapted to contain up to a maximum of 30 eight-bit characters, both the characters and the bits being processed in series. Therefore, 10 · 8 · 30 binary signals pass along the delay line LDR. The first 10 binary signals represent the first bit of the first decimal place of the registers R, N, M, J, I, Q, U, Z, D and E, respectively, the following 10 binary signals represent the second bit of the first decimal place of the same registers, respectively, and so on.

Assuming, for example, that the aforesaid binary signals are recorded in the delay line at intervals of 1 microsecond from each other, the signals belonging to a certain register will follow one another at intervals of 10 microseconds. In other words, to each register there belongs a train of 8 · 30 binary signals spaced 10 microseconds from each other, the trains of signals belonging to the different registers being displaced by 1 microsecond.

The output of the reading amplifier 39 feeds a series-to-parallel converter 42, which is adapted to make the 10 binary signals corresponding to the 10 registers available simultaneously at 10 separate outputs LR, LM, LN, LJ, LI, LE, LD, LQ, LU and LZ, respectively, whereby at a given instant the signals representing the first bit of the first decimal place of all the registers are present simultaneously at said outputs, 10 microseconds later the signals representing the second bit of the first decimal place are present simultaneously at said outputs, and so on.

Each group of 10 signals appearing in parallel at the outputs of the converter 42 is delivered, after being processed, to a parallel-to-series converter 43 which is adapted to feed the writing amplifier 41 with said 10 signals disposed afresh in series and spaced from one another by one microsecond, whereby the transducer 40 records said signals, possibly modified according to the operations performed by the computer, in the store LDR, observing the original relative arrangement of said signals. It is therefore clear that the sole delay line LDR is equivalent, as regards the external circuits which process its contents, to a group of 10 delay lines operating in parallel, each containing a single register and provided with an output LR, LM, LN, LJ, LI, LE, LD, LQ, LU and LZ, respectively, and with an input SR, SM, SN, SJ, SI, SE, SD, SQ, SU and SZ, respectively.

The aforesaid arrangement of the signals in the delay line enables all the registers of the computer to be disposed in a single delay line, with a single reading transducer and a single writing transducer and, therefore, at a cost not much greater than that of a delay line containing only one register. Moreover, as the pulse repetition frequency in the delay line is 10 times greater than in those circuits, external to the delay line, which perform the arithmetical and logical operations of the computer, it is possible to obtain at the same time a good utilization of the storage capacity of the delay line, while using relatively slow and, therefore, inexpensive switching circuits in the means for performing arithmetic and logical operations.

Figure 3:
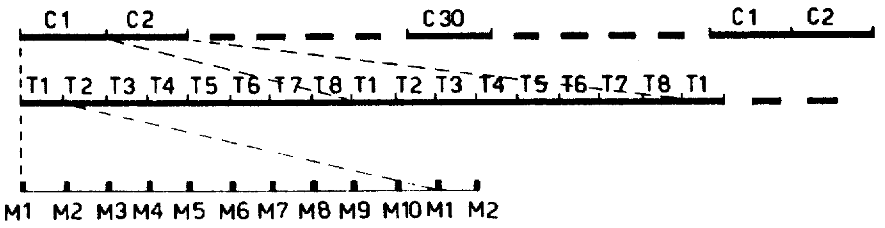
FIG. 3 shows the course in time of a number of signals present in the computer of FIGS. 1*a* and 1*b*.

In view of the cyclic structure of the delay line store, the operation of the computer is divided into successive storage cycles, each cycle comprising 30 digit periods from C1 to C30 and each digit period being subdivided into eight bit periods from T1 to T8 (FIG. 3).

A time signal generator 44 is adapted to supply at the outputs T1 to T8 successive time pulses, the duration of each of which indicates a corresponding bit period. In other words, the output T1 is rendered operative throughout the first bit period of each of the 30 digit periods, the output T2 is rendered operative similarly throughout the second bit period of each of the 30 digit periods and so on.

The time signal generator 44 is synchronized with the delay line LDR in such manner that the beginning of the *n*th generic bit period of the *m*th generic digit period coincides with the instant when the binary signals representing the 10 bits read in the *n*th binary place of the *m*th decimal place of the 10 store registers begin to be available at the outputs of the series-to-parallel converter 42. These read binary signals last for the entire corresponding bit period. In the course of the same bit period, the 10 bits resulting from the processing of the aforesaid ten bits are delivered to the parallel-to-series converter 43 and are therefore recorded in the delay line.

More particularly, the generator 44 is adapted to supply ten pulses M1 to M10 during each bit period. The pulse M1 defines the reading instant when the series-to-parallel converter 42 begins to supply the bits appertaining to the present bit period, while the pulse M4 defines the reading instant when said bits are delivered to the parallel-to-series converter 43 to be written in the delay line.

The generator 44 is constituted, for example, by an oscillator 45 which supplies pulses with the frequency of the aforesaid pulses M1 – M10 to a pulse distributor 46, which feeds in turn a frequency divider 47 supplying the pulses T1 – T8.

The oscillator 45 remains operative only while a bistable A 10 is operative, the latter being controlled by signals recorded in the delay line LDR.

Each decimal place or storage location of the store LDR may contain either a decimal digit or an instruction. More particularly, the registers I and J, referred to as the first and second instruction registers, are intended to contain a program composed of a maximum of 60 instructions recorded in order in the 30 decimal places or storage locations of the register I and the 30 decimal places or storage locations of the register J.

Of the remaining registers, the registers M, N and R are operative registers, the registers Z and U are adapted to contain only numerical data and the registers Q, D and E may contain either program instructions or numerical data.

In special circumstances, the registers Q, U, Z, D, E may be divided into two parts to contain two numbers with a maximum of 15 digits each.

In the present computer, the individual program instructions have a variable format, at least the following three typical formats being possible.

An instruction of a first format is composed of eight bits B1 – B8 respectively recorded in the binary places T1 – T8 of a certain decimal place or storage location, the last four of which represent one of 16 possible operations F1 – F16 to be performed, the remaining four representing in general the address of an operand on which said operation is performed.

The instructions of a second format are constituted by a pair of adjacent characters, each of eight bits B1 – B8 respectively recorded in the binary fit positions T1 – T8 of a pair of adjacent decimal places or storage locations. The first eight bits B1 – -B8 (first character of the character pair) represent collectively a function code indicating a certain function to be developed relative to the second character of the character pair. For example, in a particular case considered hereinafter, the eight bits of the first character represent an instruction which controls the transfer of the eight bits constituting the second character of the character pair to a predetermined decimal place or storage location of the store LDR.

The instructions of a third format are composed of eight bits B1 – B8 respectively recorded in the binary bit positions T1 – T8 of a certain decimal place or storage location and collectively indicating an eight-bit function code.

Each decimal digit is represented in the computer by means of four bits B5, B6, B7, B8 according to the decimal binary code. Said four bits are respectively recorded in the store LDR in the last four binary places T5, T6, T7 and T8 of a certain decimal place.

Moreover, in said decimal place, the binary position T4 is used to contain a decimal-point bit B4, which is equal to "0" for all the digits of a decimal number, except for the first whole digit after the decimal point; the binary position T3 is used to contain a sign bit B3, which is equal to "0" for all the digits of a positive decimal number and equal to "1" for all the digits of a negative decimal number; the binary position T2 is used to contain a digit bit B2, which is equal to "1" only for all the decimal digits of a number, being equal to 0in any decimal place not occupied by a digit.

The complete representation of a digit in the store LDR therefore engages the binary positions T2, T3, T4, T5, T6, T7 and T8 of a certain decimal place. The remaining binary position T1, on the other hand, is used to contain a tag bit which may also not have any relation to the decimal digit contained in said decimal place of the store.

More particularly, a bit B1R=1 recorded in the first decimal place or storage location C1 of the register R is used to start the time pulse generator 44 at the beginning of each storage cycle; a bit B1E = 1 recorded in the 30th decimal place or storage location C30 of the register E is used to arrest the generator; a bit B1N = 1 recorded in the *n*th decimal place or storage location of the register N indicates that during the execution of a program the next instruction to be carried out is that contained in the *n*th decimal place or storage location of the selected program register; a bit B1M = 1 recorded in the *n*th decimal place of the register M indicates: during the introduction of a number from the keyboard into the register M, that the next digit entered is to be introduced in the (*n*−1) th decimal place or storage location; during the introduction of an instruction from the keyboard, that the next instruction is to be introduced in the *n*th decimal place or storage location of the selected program register; during the printing of a number contained in a selected generic register, that the next digit to be printed is that in the *n*th decimal place or storage location of said register; during the adding of two numbers, that that digit of the result which is recorded in the *n*th decimal place or storage location of the register N must thereafter be corrected by adding a predetermined digit; a bit B1Z = 1 recorded in the 16th decimal place or storage location C16 of the register Z constitutes a countersign which enables the registers Q, U, Z, D, E to be divided into two halves; a bit B1U = 1 recorded in the *n*th decimal place or storage location of the register U indicates that the execution of a main program has been interrupted at the *n*th instruction of the register I or J to pass over to the execution of a subprogram. Therefore, the bits B1R, B1E, B1Z represent fixed reference points in the various registers; the bits B1N, B1M and B1U represent movable reference points; moreover, the bits B1M serve during addition to record for each decimal place a piece of information relating to an operation carried out in said place. The regeneration and modification (shifting) of said tag bit is effected by a tag-bit control circuit 37.

The computer moreover comprises a binary adder 72 provided with a pair of inputs 1 and 2 adapted to receive simultaneously two bits to be added, to supply the sum bit simultaneously at an output 3.

The computer is moreover provided with shift register K comprising eight binary stages K1 - K8. The register K, which is of a type known per se, is designed so that each time it receives a shift control pulse at a terminal 4 the bits contained in the stages K2, K3, K4, K5, K6, K7, K8 are transferred to the preceding stages K1, K2, K3, K4, K5, K6 and K7, respectively, and moreover the bits present at the inputs 5, 6, 7, 8, 9, 10, 11, 12, 13 are transferred to the stages K1, K2, K3, K4, K5, K6, K7, K8 and again K8, respectively.

The shift control pulses are constituted by the pulses M4 and the register K therefore receives one of these pulses at each bit period, that is eight at each digit period. The contents of each stage of the register K remain unchanged by the pulse M4 of each bit period until the pulse M4 of the following bit period. It is therefore clear that a bit present at the input 13 of the register K during a certain bit period will reappear at the output 14 of said register after eight bit periods, that is delayed by a digit period, so that the register K behaves in this case like a section of line with a delay of the length of a digit period.

Connecting a generic store register X to the register K in a closed loop, leaving the other registers closed directly on themselves, is equivalent to lengthening it by one digit period with respect to said registers. If it is also agreed to define as the *n*th decimal place or storage location of the register X that place which is read simultaneously with the *n*th decimal place or storage location of the other registers, that is during the *n*th digit period starting from the reading of the bit B1R starting the generator 44, it is clear that the contents of the register X will then undergo a shift of one decimal place, that is a delay of one digit period with respect to the other registers, at each storage cycle.

Moreover, inasmuch as the register K functions as a delay line, it is adapted to form a counter according to the principles set forth on page 198 of the book "Arithmetic Operations in Digital Computers" by R.K. Richards, 1955, if its input 13 and its output 14 are connected to the output 3 and the input 1, respectively, of adder 72 and the input 2 of the latter does not receive any signal, said counter being adapted to count successive counting pulses fed to a carry bistable A5 contained in the adder, according to the rule specified hereinafter. Considering the eight bits contained in the register K as belonging to a number of eight binary places, a counting pulse can be fed to the bistable A5 at the instant when the bit of lowest significance issues from the register K. The counting pulses will therefore have to follow one another at an interval of one digit period or of a multiple of one digit period.

The register K is moreover adapted to function as a transfer store for temporarily containing a decimal digit, or the address part or function part of an instruction, for the purpose of controlling a printing device for printing said digit or said address part or function part.

Finally, the register K is adapted to function as a parallel-to-series converter in the transfer of data or instructions from a keyboard 22 to the store LDR, as described more fully in the above-mentioned U.S. Pat. No. 3,304,418.

The computer is moreover provided with an instruction staticisor 16 comprising eight binary stages I1 - I8 adapted to contain the eight bits of an instruction, respectively.

These eight binary stages I1 - I8 containing the address bits B1 - B4 and the function bits B5 - B8 of said instruction feed a decoder 17 having eight inputs and various outputs Y1 - Y8 and F1 - F16.

The first four stages I1 - I4, containing the address bits B1 - B4 of said instruction, feed the first four inputs of the decoder 17. In the case of an instruction of the first format previously described, of the eight outputs Y1 - Y8 each corresponding to one of the eight addressable store registers, there is energized that one corresponding to the register of which said four bits B1 - B4 indicate the address.

It should be noted that the address of the register M is represented by four bits equal to 0, so that if a different address is not specified the register M is selected automatically.

The remaining four stages I5 - I8, containing the bits B5 - B8 of the staticized instruction, feed the other four inputs of the aforesaid decoder 17. In the case where the staticized instruction 15 of the first format, that one of the outputs F1 - F16 which corresponds to the function represented by said four bits B5 - B8 is energized.

In the case of instructions of the second and third formats, in which the eight bits B1 - B8 of the first character of the pair of characters of the instruction of the second format and of the sole character of the instruction of the third format collectively represent an eight-bit function code, as hereinbefore described, a single output of the group F1 - F16 is energized, namely F15 or F14, respectively, while none of the outputs of the group Y1 - Y8 is energized, since in this case the instruction character actually staticized does not represent any of the addresses Y1 - Y8.

Moreover, the outputs of the stages I - I4 and the outputs of the stages I5 - I8 can be connected through gates 19 and 20, respectively, to the inputs of the stages K5 - K8, respectively, of the register K, for the purpose of printing the address and the function, respectively, contained in said stages. A switching network 36 known per se is adapted to interconnect in various ways the store registers, the adder 72, the register K and the instruction staticizer 16, for the purpose of controlling the transfer of date and instructions between the various parts. It is therefore clear that there is also entrusted in particular to the switching network 36 the selection of the registers on the basis of the address supplied by the decoder 17.

The keyboard 22 for entering the data and instructions and for controlling the various functions of the computer comprises in particular a numerical keyboard 65 having 10 numeral keys 0 to 9 by means of which it is possible to enter a number through the register K into the register M, which is the only one of the registers of the store LDR which is directly accessible from the numerical keyboard.

The keyboard 22 moreover comprises an address keyboard 68 provided with keys Q, U, Z, D, E, N, R, each of which controls the selection of the corresponding register of the store LDR.

Finally, the keyboard 22 comprises a function keyboard 69 provided with keys F1 - F16, each of which corresponds to the function part of one of the instructions which the computer is able to execute.

The three keyboards 65, 68 and 69 control a mechanical decoder known per se provided with code bars associated with electric switches which are adapted to supply on four lines H1, H2, H3, H4 an equal number of binary signals representing the four bits of the decimal digit set up on the keyboard 65, or of the address set up on the keyboard 68, or of the function set up on the keyboard 69, said decoder being moreover adapted to energize the line G1, G2 or G3 indicate that the setting up has actually been carried out on the keyboard 65, 68 or 69, respectively.

A decimal-point key 67 and a negative algebraic-sign key 66 directly produce a binary signal on the lines V and SN, respectively.

Some os said instructions which the computer can execute are in particular, in the example illustrated and using the letter Y to indicate the generic register corresponding to the address specified in the instructions:

F1. Addition: transfer the number contained in the register Y now selected to the register M, then add the contents of the register M to the contents of the register N, and record the result in the register N, that is in symbolic form Y — M; (N +M) — N;

F2. Subtraction: similarly Y — M; (N −M) — N;

F3. Multiplication: similarly Y — M; (N · M) — N;

F4. Division: similarly Y — M; (N : M) — N;

F5. Transfer from M: transfer the contents of the register M to the register Y now selected, that is M — Y;

F6. Return to N: transfer the contents of the register now selected to the register N, that is Y — N;

F7. Exchange: Transfer the contents of the selected register to the register N and vice versa, that is Y — N; N — Y;

F8. Printing: print the contents of the register now selected;

F9. Print and zeroize: print the contents of the register now selected and also zeroize the register;

F10. Enter a datum: stop the automatic execution of the program and wait until the operator enters a new datum; introduce this new datum into the selected register and after this resume automatic operation;

F11. Extract from the register I one of the first eight characters located in one of the first eight storage locations, in particular that specified by the address of the present instruction, and transfer it to the register M;

F12. Unconditional jump to the program instruction specified in the present instruction;

F13. Conditional jump.

The last two instructions are examined in greater detail in the aforesaid U.S. Pat. No. 3,469,244; note particularly col. 29, lines 72–75, col. 30, lines 1–75, and col. 31, line 1–59.

F14) Jump to the instruction contained in the first place or storage location of the first program register. This is an instruction of the third format, according to the nomenclature previously used, the eight bits of which it is composed representing collectively the function described here. This is a special type of unconditional jump, the use of which is essentially linked to the operation of re-entry from a subprogram into the main program.

The aforesaid instructions are each constituted by a single eight-bit character. As has been said, however, there are also instructions constituted by a pair of adjacent characters (two - character instructions).

Among these it is important to mention the following one here:

F15·(F12·Sn), in which F15 indicates the first eight-bit character representing the function: this modifies the first instruction of the first program register, replacing it by the eight bits forming the second character of the present instruction. These eight bits comprise four bits indicating a jump function F12 and four bits which are used to indicate the location Sn to which the jump is to be made. As explained in U.S. Pat. No. 3,469,244, col. 29, lines 72–75, col. 30, lines 1 –75, and col. 31, lines 1–59. hereinbefore mentioned, the addressing on the basis of the code contained in the address part of the instruction, with the intention that the final place of the jump should be the first of the places encountered in the orderly scanning of the store by reading transducer 38, in which said code is contained.

This modification of the instruction is utilized essentially in the re-entry from a subprogram into the main program in accordance with the invention.

The method of operating these instructions will be explained more fully hereinafter.

The computer is adapted to operate in three ways, namely "manual," "automatic" and "entering of programm," according to whether a three-position changeover switch 23 generates a signal PM, PA or IP, respectively. All the aforementioned instructions can be executed by automatic operation and the first nine also by manual operation.

During the entering of the program, the signal IP being present, the address keyboard 68 and the function keyboard 69 serve, as will be seen, to enter the various instructions of the program in the registers intended therefor through the register K. To this end, the outputs H1 – H4 of the keyboard can be connected, through a gate 24, to the inputs 8 – 11, respectively, of the register K. During this time the numerical keyboard 65 is inoperative.

During automatic operation, when the program entered in the store is executed, the address and function keyboards are inoperative.

Automatic operation comprises a sequence of instruction extraction and execution phases. More particularly, during a generic extraction phase, an instruction is extracted from the program registers and transferred to the staticisor 16; said phase is followed automatically by an execution phase in which the computer, controlled by said staticized instruction, executes said instruction; said execution phase having been completed, there follows automatically the next extraction phase, in which the next instruction is extracted from the program registers and staticized in place of the preceding instruction, and so on.

In the case in which an instruction of the second format is interpreted and executed, which instruction, as hereinbefore described, is formed by a pair of adjacent characters each of eight bits, only the first character of said instruction is extracted from the program registers and transferred to the staticisor 16; said phase is followed by an execution phase in which, under the control of said staticized first character, the eight bits B1 – B8 of which collectively represent a function code indicating a certain operation to be carried out on the second character of the character pair the computer performs the transfer of the eight bits forming the second character of the character pair to a predetermined decimal place or storage location of the store LDR; said execution phase having been completed, there follows automatically another extraction phase in which the instruction following the second character of said two-character instruction is extracted from the program registers and staticized in place of the first character of the two-character instruction. As long as an instruction remains staticized in the staticisor 16, the numerical store register indicated by the address part of the instruction remains continuously selected and, moreover, the decoder 17 continuously supplies the signal corresponding to the function part of the instruction. During automatic operation, the numerical keyboard is also normally inoperative, inasmuch as the computer operates on the date previously entered in the store, and said keyboard is used only when the program instruction staticized at the moment is a datum entering instruction F10. It is clear that this instruction makes it possible to operate by means of a certain program on a number of data greater than that which the store may contain initially.

Finally, during manual operation, all three keyboards, the numerical, the address and the function keyboards, are operative. More particularly, in this method of operation, the address and function keyboards may be used by the operator to cause the computer to execute a sequence of operations similar to that executed during automatic operation. To this end, the operator enters manually an address and a function, whereby these are staticized via gates 70 and 71, respectively, in the staticisor 16, similarly to what occurs in an instruction extraction phase during automatic operation. Said entering operation on the keyboard moreover starts an execution phase of the instruction entered in this way, this phase being similar to the execution phase in automatic operation, and when said execution phase has been completed the computer stops and waits for a new instruction to be set up.

As has already been said, if none of the address keys is depressed, the register M is automatically selected, this register, moreover, as has also been said, being the register which receives the data entered on the numerical keyboard. If, therefore, when entering one of the instructions F1, F2, F3, F4 corresponding to the four fundamental arithmetical operations, it is omitted to depress the address key and instead a certain number is entered on the numerical keyboard, said operation will be carried out on said entered number. Therefore, in manual operation, any arithmetical operation corresponding to the key depressed in the function keyboard 69 can be carried out either on a number which is possibly set up immediately beforehand on the numerical keyboard 65 or on the number contained in the register possibly selected by means of the address keyboard 68.

It has moreover been seem that in automatic operation the instructions are executed on data previously entered in the store. Before starting the execution of the automatic program by pressing a push-button AUT, it is possible to introduce each of said initial data by putting the machine in the manual-operation state and first setting up said datum on the numerical keyboard, whereby it is entered in the register M, then depressing the address key corresponding to the register into which said datum is to be entered and then depressing the key corresponding to the transfer instruction F5.

Figure 4:
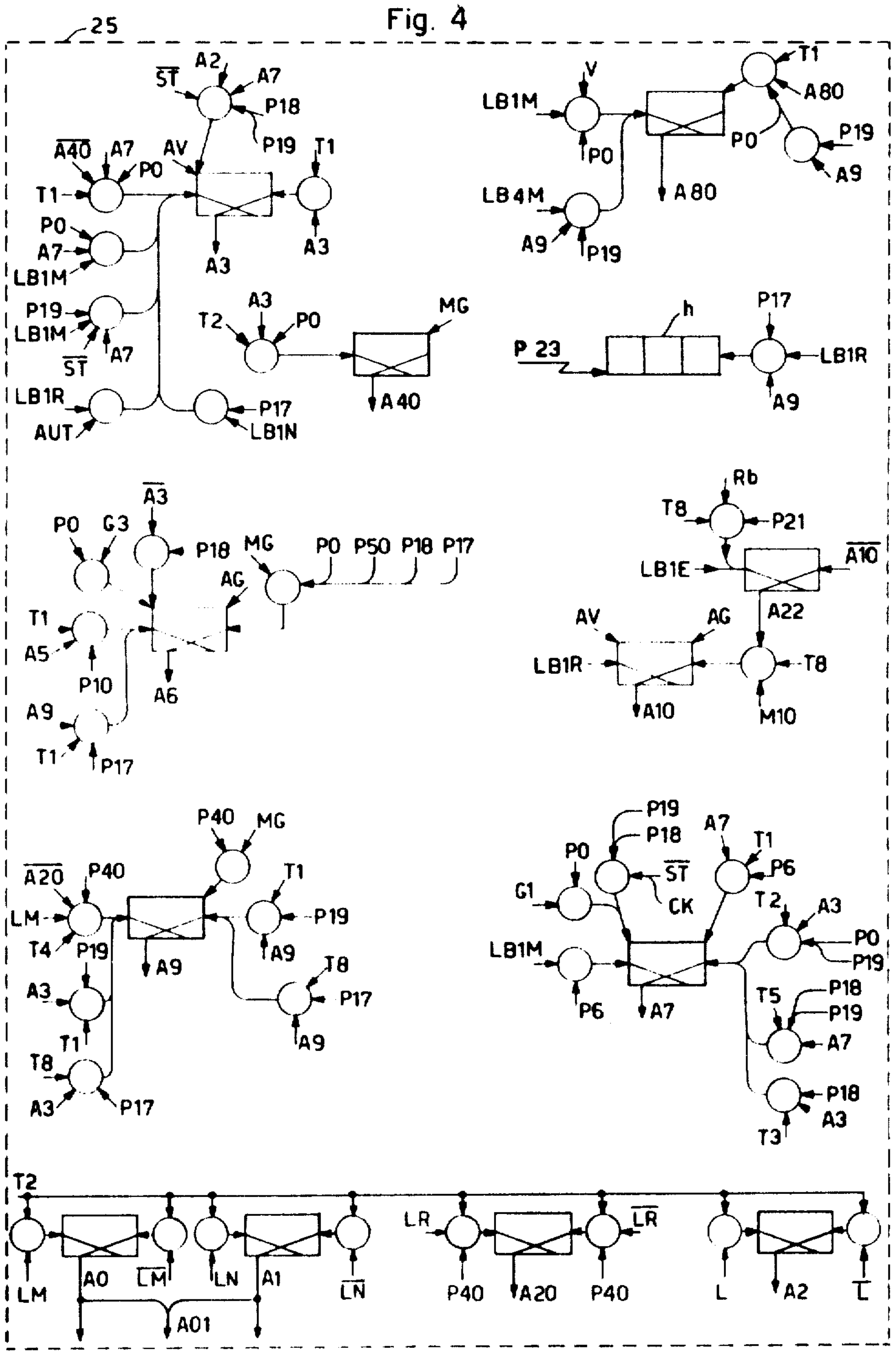
FIG. 4 shows a group of bistable devices of the computer according to FIGS. 1*a* and 1*b*.

The computer is moreover provided with a group of internal-condition bistables represented collectively by the rectangle 25 in FIG. **1*b* and in detail in FIG. 4. Among these bistables, the bistable AO is rendered operative during each store cycle at the first bit period T2 where the digit bit B2** read in the register M is equal to 1, and is rendered inoperative at the first bit period T2 where the digit bit read is equal to 0, and therefore remains operative throughout the time spent in reading the number contained in the register M. In other words, the bistable AO indicates in the extent of each store cycle the length and the position of the number contained in the register M. In fact, according to a characteristic of the computer of the invention, said length and said position may be completely variable.

The bistables A1 and A2 have a similar function for the register N and for the register Y selected at the moment, respectively, the bistable A1 being controlled by the output LN of the register N and the bistable A2 being controlled by the output L of the register selected at the moment. The outputs of the bistables AO and A1 are combined to give a signal AO1 which lasts, during each cycle, from the reading of the first of the digits of the numbers M and N until the reading of the last of the digits of the numbers M and N.

The bistable A3 is used to distinguish a certain digit period during which a given operation is performed, remaining operative during said digit period and inoperative during the remaining digit periods.

The bistable A7 is generally used to distinguish a certain store cycle from the following cycles during the operations in which the input unit 22 and the output unit are involved. The bistables A6, A8, A9 indicate the occurrence of certain conditions in the course of the execution of a certain instruction. For a more detailed description of the operation of these internal-condition bistables, reference should again be made to U.S. Pat. No. 3,304,418.

The computer also comprises a counter *h* having three bistables and which, in accordance with the state of energization of the three bistables of which it is composed, effects the successive reading of the store registers containing program instructions. The registers are scanned in order in the sequence I, J, Q, D, E.

More precisely, the ascending front which renders a state bistable P23, operative puts the counter *h* into a state such as to permit the scanning of the first instruction register I.

Thereafter, at each magnetostrictive line cycle, the reading LB1R of the bits B1R = 1 starting the oscillator 45 adds 1 to the contents of the counter *h*, whereby the various program registers are read in order.

The computer is moreover provided with a sequence control unit 26 comprising a group of state bistables P1, P2, P3 . . . Pn which can be rendered operative one at a time, whereby at any instant the computer is in a well-defined state corresponding to the bistable P1 – Pn rendered operative at the moment. The operation of the computer entails its passing through a certain sequence of states in each of which a certain elemental operation is performed.

Figure 5:
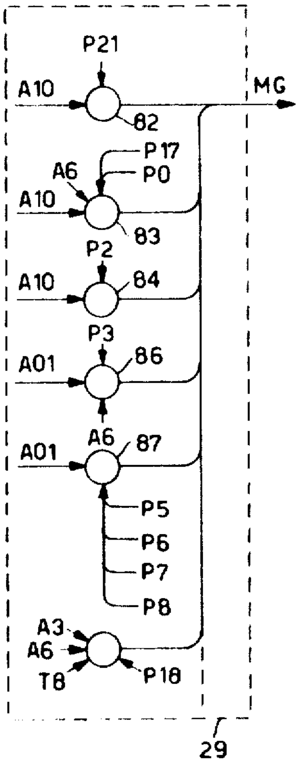
FIG. 5 shows a circuit for controlling the tag bits used in the computer according to the invention.
Figure 2:
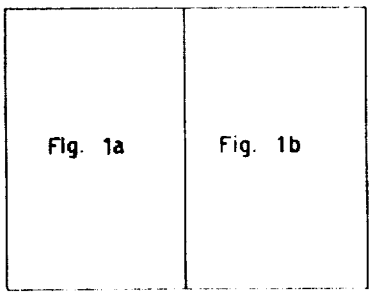
FIG. 2 is a diagram showing FIGS. 1*a* and 1*b* put together.

The rule in accordance with which said states follow one on the other is determined by a logic network 27 known per se which, on the basis of the knowledge of the present state supplied to it by the bistables P1 – Pn via the line P, of the instruction staticized at the moment, supplied to it by the decoder 17 via the line F, and of the existing internal conditions of the machine, supplied to it by the bistables of the group 25 via the line A, decides what the future state must be, rendering operative from among its own outputs 28 the one corresponding to said future state. When a logic network 29 (FIG. 5) then produces a change-of-state timing pulse MG, the state bistable corresponding to said future state is rendered operative via the gate 30 corresponding to said output 28, while all the other state bistables are rendered inoperative.

The computer is also equipped with various other devices described in U.S. Pat. Nos. 3,469,244 and 3,495,222. Note particularly, in U.S. Pat. No. 3,469,244, chapters "Printing unit" in col. 10, "Printing out a number stored in a register" in col. 25, "Entering a number into the memory via the keyboard" in col. 12 and "Entering a program through the keyboard" in col. 28; note, in U.S. Pat. No. 3,495,222, chapter "Program card" in col. 26.

TRANSFERS FROM ONE REGISTER TO ANOTHER

Transfers between the registers of the store LDR usually take place in a state P2 of the machine which lasts a single store cycle extending between two successive starts of the oscillator 45. More particularly, in said state P2, both during manual operation and during automatic operation, if the instruction Y·F6 is present in the staticisor 16, that is if the register selected at the moment is the generic register Y and the function staticized is F6, the switching network 36 closes on themselves, for the purpose of ensuring their regeneration, all the registers except the register N, and moreover connects the output of the selected register to the input Sn of the register N, whereby the contents of the register Y are transferred to the register N in a single store cycle.

If, on the other hand, the function part of the instruction present in the staticisor 16 is Y·F7, the switching network 36 closes on themselves, for ensuring the regeneration thereof, all the registers except the register N and the register Y selected at the moment and moreover connects the output of the register N and of the register Y to the input of the registers Y and N, respectively, whereby the contents of the register Y are transferred to the register N and vice versa.

If, on the other hand, the addition instruction Y·F1, or the subtraction instruction Y·F2, or the multiplication instruction Y·F3 or the division instruction Y·F4 is present in the staticisor 16, the switching network 36 closes on themselves, in order to ensure regeneration, all the registers except the register M and moreover connects the output of the register Y selected at the moment to the input of the register M, whereby the contents of the register Y are transferred to the register M.

In each case, if no address is specified in the instruction, this means that the register M is addressed as usual.

Whatever the instruction staticized at the moment in the state P2, when the generator 44 restarts, the gate 84 in the circuit 29 (FIG. 5) is opened to produce a change-of-state control pulse MG, by the effect of which the computer changes to the following state determined by the nature of said instruction.

If the multiplication instruction Y·F3 is staticized, in a different state P9 of the machine the connections established by the switching network 36 cause, on the other hand, in a similar manner to that hereinbefore explained, the transfer from the register N to the register R.

Any other transfer between the registers takes place in similar manner.

In the case where it is desired to transfer the contents of a generic decimal place Cn of a generic register, for example Y, to a corresponding decimal place of another register, for example an instruction register I, recourse is had to the bistable A9, which is rendered operative for the digit period corresponding to said decimal place Cn.

During said digit period Cn, the bistable A9 acts on the reading bistable LI of the instruction register, rendering it inoperative. At the same time and again with the permission of the bistable A9, the output of the reading bistable LY of the register Y is connected to the writing bistable SI of the register I: in this way, the replacement of the contents of the desired register I is obtained.

ALIGNMENT OF NUMBERS IN THE STORE

As has been seen, the numbers are entered in the register M from the keyboard without paying attention to their alignment with respect to the numbers contained in the other registers. Before performing any one of the four fundamental arithmetical operations, the two numbers involved therein are aligned, in the manner briefly described here.

As has been seen, when a register of the store LDR is connected to the register K in a closed loop, its contents are subjected to a delay of one digit period at each store cycle with respect to the other registers closed on themselves, which are simply regenerated. Therefore, the aforesaid connection of the registers having been established by means of the switching network 36, in order to align a number contained in a certain register, for example M, so that its first whole digit with which the decimal point is associated is located in the first decimal place C1, it will be sufficient to cause the computer to execute, in an alignment state P3 thereof, repeated store cycles until, in a certain cycle, during the first digit period C1 indicated, as has been seen, by the reading of a tag bit B1R = 1, a decimal-point bit B4 = 1 is read in the register M. If this coincidence occurs, the bistable A6 is rendered operative in manner known per se and not shown in the drawings and therefore signals in such case that the desired alignment has taken place. The bistable A 6 being therefore rendered operative, at the next reading of the first digit of the number M or N, the ascending front of the signal AO1 produces in the circuit 29 (FIG. 5) via the gate 86 a pulse MG which causes the computer to change to the following state.

Similarly, in a suitable state P14, it is possible to shift a number until its most significant digit is in the first decimal place C1 of a certain register. Generally speaking, it is clear how, by utilizing the tag bits, it is possible to align the numbers in accordance with various criteria.

The operation of the electronic computing machine during the execution of the program will now be examined.

More particularly, the phases of interpretation and execution of the instructions of the three typical formats hereinbefore considered will be described.

INTERPRETATION AND EXECUTION OF AN INSTRUCTION OF THE FIRST FORMAT

Let us assume that the program has already been entered in the store registers.

By pressing the push-button AUT, automatic execution of the program is initiated. The pressing of the push-button AUT puts the machine into the state P17, in which the switching network 36, in addition to connecting the output of each register to the respective input, for the purpose of ensuring the regeneration thereof, provides the connection of the register I, the register J or other registers which are possibly used for containing instructions to the instruction staticisor 16 during the single digit period C in which the instruction to be extracted and executed is read, said digit period being indicated by the bistable A3 being rendered operative.

More particularly, in the first store cycle which occurs during the actuation of said push-button, the bit B1R = 1 staring the oscillator 45 in the period C1 of the first digit period renders the bistable A3 operative, this being rendered inoperative by the end of said digit period.

Therefore, in said first digit period C1, the output LI of the register I is connected to the instruction staticisor 16, whereby the eight bits of the first instruction of the program are written into the eight stages I1 – I8 of which said staticisor is formed, where they remain until, when the first instruction has been executed, the second is extracted. Moreover, in said digit period C1, the bistable A3 being operative, the pulse T8 renders the bistable A9 operative and the latter is then rendered inoperative by the first pulse T8 that follows. Therefore, the bistable A9 serves to introduce, by means of its own operative state, the digit period following that of the instruction extracted at the moment.

Said bistable A9 being rendered operative, the tag-bit control circuit 37 writes a bit B1N–1 in the second decimal place C2 of the register N via a gate, said bit B1N constituting a countersign which will enable the next instruction to be extracted, which is precisely the second, to be recognised.

Moreover, the bistable A9 being rendered operative, the pulse T1 of said second digit period renders operative the bistable A6 to indicate that the instruction to be extracted has been recognised and extracted. Consequently, at the end of the cycle of the magnetostrictive line, the ascending front of the signal A10 produces in the circuit 29 via the gate 83 a signal MG which effects the change to the next state, said state being determined by the network 27 in dependence upon the instruction just extracted and staticized.

Said next state is the first of a sequence in which said instruction is executed.

The execution of the first instruction having been completed, the machine returns automatically to the state P17, in which the second instruction is extracted, and so on.

Generally speaking, at the end of the sequence of states in which the *n*th instruction has been executed, the machine passes automatically into the state P17, under the control of end-of-operation signals derived in known manner.

In the state P17, the machine executes a store cycle during which a search is made in the programme registers for the instruction to be extracted, which is the ($n$+1) th, recognizable by the presence of the bit B1N–1 in the ($n$+1) th decimal place of the register N. The reading of said bit B1N renders operative the bistable A3, which indicates the useful digit period for the extraction of the instruction. Moreover, the bistable A9, indicating the following digit period, enables the bit B1N–1 to be written in said following digit period, that is it enables it to be shifted from the instruction extracted at the moment to the next instruction to be extracted.

INTERPRETATION AND EXECUTION OF AN INSTRUCTION OF THE SECOND FORMAT

The foregoing description relates to the operation of the machine during the phases of interpretation and execution of the instructions constituted by a single eight-bit character. The similar operation in the case of a two-character instruction, that is an instruction constituted by two consecutive characters (second instruction format according to the nomenclature used), for example of the type F15 · DV, will now be briefly described.

Let us assume, more particularly, that the execution phase of a generic instruction having been completed, there are read in the following interpretation phase eight bits which, staticized in the staticisor 16, yield the decoded F15.

As previously described, the eight bits of the code F15 are staticized in the eight stages of the staticisor 16, where, however, due to the special configuration of the two-character code, they remain until the instruction following the second character of the character pair is extracted.

In the following state P27, by rendering the bistables A3 and A9 operative and inoperative in a similar manner to that already described in the preceding chapter, a bit B1N = 1 is a written through the medium of the circuit 37 in the decimal place containing the second character DV of the two-character instruction, which is precisely the next instruction character to be extracted.

Moreover, still in this state P27, an erasure of the entire register M is carried out, thereby preventing regeneration, and a single instruction, that of the jump character DV, is transferred to it.

The operation of the machine during this transfer phase is described in the chapter Transfer From One Register To Another. As described therein, in consequence of the transfer operation, the aforesaid character DV is located in that transfer operation, the aforesaid character DV is located in that decimal place of the register M which corresponds to the place in which it was in the instruction register from which it has been transferred.

A change is therefore made to the following state P3, which lasts several cycles of the magnetostrictive line and in which an alignment of the register M in the first decimal place is effected in the manner described in chapter Alignment of Numbers In The Store, whereby the jump character DV is located in the first place of the register M.

The machine then changes automatically to the following state 32 in which the jump code DV is transferred, in the manner described in the Transfer From One Register To Another chapter, from the first place of the register M to the corresponding place of the first program register I.

The sequence of states inherent in the two-character instruction is therefore exhausted and the machine changes automatically to the state P17, during which the following instruction is extracted and is interpreted and executed as hereinbefore described in dependence upon the particular format.

INTERPRETATION AND EXECUTION OF AN INSTRUCTION OF THE THIRD FORMAT

Let us assume that the machine is in the state P17 and that the instruction F14 is extracted in this state and staticized by the staticisor 16.

The instruction F14 now causes the computer to change to the state P23. At the beginning of this state, the ascending front of the relative signal P23 zeroizes the counter *h* (FIG. 4), whereby the latter is in the particular condition corresponding to the first program register I, so that from now on the mechanism scanning, interpreting and executing the successive program instructions will act starting from the first instructions of the register I.

This state 23 is followed afresh by the state P17, in which the first instruction of the register I is extracted.

However, so that this instruction may be extracted, it must be furnished with the tag bit B1E = 1, as described in the chapter "General Description." Therefore, in the very first instants of the state P17, before the actual scanning of the first decimal place begins, it is necessary to provide this first decimal place with the aforementioned tag bit B1N = 1, in the manner which will now be described.

To this end, the beginning of the timing store cycle, coinciding with the bistable A10 being rendered operative, causes the energization of the bistable A3: this is obtained (FIG. 6) by causing the signal LB1 in the bistable A3. By then taking advantage of the fact that the actuation of the bistable A10, which defines the useful fraction of the store cycle, and the actuation of the bistable T1, which defines the first bit period of the first character, are separated by some microseconds, the deenergization of the bistable A3 is produced with the ascending front of the signal T1.

The deenergization of A3 causes the energization of A9, which permits the control circuit 37 to write the tag bit B1N = 1 in the first decimal place. The recording of the bit B1N in the first decimal place of the register having been obtained in this way, this bit is immediately re-read to control in the usual manner the extraction of said first instruction.

CHANGING FROM THE MAIN PROGRAM TO A SUBPROGRAM AND VICE VERSA

Figure 6:
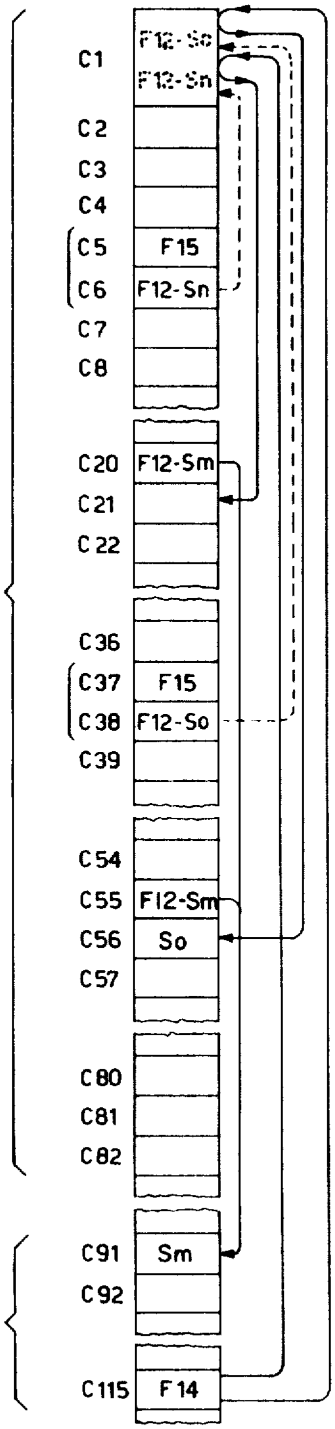
FIG. 6 is a flow diagram of the execution of the instructions of a main program and of a special subprogram which is to be repeated twice, in the computer according to the invention.

There will now be described with particular reference to FIG. 6 the execution of a program entailing changing from a main program to a subprogram and the subsequent re-entry into the program. More particularly, FIG. 6 relates to a main program comprising 81 instructions allocated to the decimal places or storage locations C2 to C82 of the instruction registers of the store LDR, and to a subprogram comprising 25 instructions allocated to the places C91 to C115. The successive places in the store are represented by means of a succession of aligned rectangles, since, as has been explained, the counter *b* and the associated circuits render the operation of the various instruction registers similar to that of a single register with a length equal to the sum of their lengths.

It is understood that the main program may be of any length whatsoever. In the case where its length exceeds the total capacity of the instruction registers, it will be possible to introduce it into the machine and then execute it in successive blocks, each block being introduced, for example, by means of the reading of a card, as explained in the aforementioned U.S. Pat. No. 3,495,222, (chapter "Program card," col. 26).

After the program has been entered in the store registers and the computer has been prearranged for automatic execution by depressing the key AUT, the computer interprets and executes the instruction contained in the first place C1. For reasons which will become clear hereinafter, this first place does not contain a significant program instruction.

The execution phase of this first instruction having been completed, the following instruction contained in the place C2 is automatically extracted and executed, and a similar procedure is followed with the successive instructions contained in the places C3 and C4.

It will be assumed that these instructions are of the first format; the processing thereof therefore takes place as hereinbefore described in the chapter "Interpretation And Execution Of An Instruction Of The First Format."

Thereafter, the instruction contained in the place C5 is extracted and interpreted, this instruction being assumed to be constituted by the first character of a two-character instruction (second format). More particularly, it is assumed that the two-character instruction considered here is of the type F15 (F12·Sn) already considered in the preceding chapter "Interpretation And Execution Of An Instruction Of The Second Format," and is adapted to prearrange, before the exit from the main program to a subprogram, the re-entry from the subprogram into the main program. The phases of interpretation and execution of this particular type of instruction of the second format have been described in the above-mentioned chapter on second format instructions.

The computer therefore substitutes the second character of the present two-character instruction contained in the place C6 for the contents of the first store place C1. As has been said, this character is the character (F12·Sn), the significance of which has been described in the section "General Description." More particularly, F12 represents the jump function and Sn represents the address at which the jump will end. It is understood that in the execution phase of the two-character instruction considered here the eight bits of the second character (F12·Sn) are simply transferred en bloc to the place C1, like any datum to be transferred irrespective of the significance referred to above and which they have interpreted xx like a single instruction of the first format.

Continuing thereafter the execution of the program, the machine interprets the following instructions contained in the places C7 to C19. Following this, the computer goes on to interpret the instruction contained in the place C20. It is assumed that this is a jump instruction F12·Sm, which controls the jump from the address Sm representing the address of commencement of the subprogram. More particularly, in accordance with the method of executing a jump as described in the aforementioned U.S. Pat. No. 3,469,244 (see col. 29 "-Jump") Sm represents an insertion code which has been placed during the programing process at the beginning of the subprogram in the place C91 preceding the place C92 in which the first useful instruction of the subprogram is located.

In the execution phase of these jump instructions, the computer therefore leaves the main program and sets itself into the condition to commence the execution of the subprogram.

It is necessary to note the fact that the two-character instruction F15·(F12·Sn) modifying the first instruction of the main program must be arranged in the program so as to precede the instruction to jump to the subprogram: this is required by the fact that the function of said two-character instructions is to prearrange the re-entry into the main program, a preestablished instruction, after the execution of the subprogram.

The computer now goes on to interpret and execute the first instruction of the subprogram located in the place C92 and continues thereafter to process the other instructions of the subprogram; the last instruction of the subprogram is a jump instruction F14 (of the third format), which imposes on the computer a jump to the instruction contained in the first place C1 of the program registers. As has been said, this last-mentioned instruction is a jump instruction F12·Sn. This is now duly interpreted and executed, whereby it produces the jump to the jump address Sn. This address distinguishes the instruction of the main program from which the execution of said main program must be resumed. Assuming that the reference code corresponding to this address has been prearranged in the place C21, the execution of the main program will be resumed from the instruction contained in the place C22. The machine then continues to execute the program and interprets and executes the following instructions contained in the places C23 to C36.

The instruction contained in the place C37 is thereafter extracted and interpreted, this instruction being assumed to be constituted by the first character F15 of another two-character instruction (second format) similar to that which the computer has already encountered during the execution of the program in the store places C5 and C6.

In a similar manner to that already described, the computer therefore substitutes the second character of the present two-character instruction contained in the place C38 for the contents of the first store place C1. Said character is the character F12·So. As hereinbefore described, F12 represents the jump function and So represents the address at which the jump is to end.

Continuing thereafter to execute the program, the machine interprets and executes the following instructions contained in the places C 39 to C54.

The computer than goes on to interpret the instruction contained in the place C55. It is assumed that this is again the jump instruction F12·Sm: therefore, said instruction again effects the jump to the address Sm representing the beginning of the subprogram. The passage from said jump instruction F12·Sm to the first place of the subprogram containing the address Sm and the subsequent interpretation and execution of said subprogram have already been described hereinbefore.

The final instruction F14 (third format) of the subprogram again imposes on the computer a jump to the instruction contained in the first place C1 of the program registers.

This instruction, as hereinbefore stated, is now a jump instruction P12.So, which, duly interpreted and executed, effects the jump to the corresponding jump address So.

It is assumed that the code corresponding to said address So, which distinguishes the instruction of the main program from which the execution of said main program must be resumed, is allocated to the place C56; the execution of the main program will be resumed from the instruction contained in the place C57 and will continue until the instruction contained in the place C82, which is assumed to be the last place of said main program, is extracted and executed.

PROGRAM CARDS

The computer is equipped with a car recording and reading device, the cards, for example, being magnetic cards of the type described in the above-mentioned U.S. Pat. No. 3,495,222; note particularly chapter "Program card" in col. 26.

The capacity of each card is equal to the total capacity of the five registers I, J, Q, E and D.

By the effect of introducing the card into the reading device, as described in the above-mentioned U.S. Pat. No. 3,495,222, chapter "Program card" in col. 26, the information recorded on the card is transferred in order to the five registers aforesaid. As has been said, the two registers I and J are specialized to contain program instructions, while the remaining registers Q, E and D may contain, at choice, either instructions or data to be processed.

A program may therefore, depending upon its length, fill either the first two, or the first three, or the first four or all five of the aforesaid registers, the remaining registers and the corresponding zones of the cards being available each time for containing data to be processed.

As described in the above-mentioned U.S. Pat. No. 3,495,222, chapter "Program card" in col. 26, the manual operation of introducing a card into the reader automatically causes the introduction in order of all the contents of the card into the store registers.

In the present computer, it is moreover possible, at the choice of the operator, to make use of cards with a reduced storage capacity, equivalent more particularly to that of only two registers. This is achieved by the depression of a relevant card partialization key SP. As hereinbefore described, during the phases of recording and reading a card, the successive scanning of five registers I, J, Q, D and E is obtained by means of a counter *h* which addresses them in order. Operation with partialized cards is determined by the fact that said push-button SP compels the aforesaid counter to begin counting starting from the address of the first location of register D, whereby only the registers D and E are concerned in the phases of recording and reading said card, which is therefore partialized.

The partialized card can be used for entering a subprogram in the internal store LDR without destroying the main program entered beforehand in said store by the use of a non-partialized card.

It is therefore clear that each partialized card is adapted to contain a given subprogram which is permanently available to the operator, whereby it is possible to form beforehand a collection or library of subprograms alongside the collection of programs constituted by the non-partialized cards.

It is clear that by the simple operation of introducing a partialized card manually into the reader said partialized card causes the recording of the corresponding subprogram in a predetermined zone of the internal store LDR, in such manner that, without any need for further operations, said subprogram is immediately available for being executed.

The moment when the operator is able to introduce a subprogram in the above-mentioned manner is determined by a stop instruction contained in the main program.

EXECUTION OF A PROGRAM WITH TWO RECORDED SUBPROGRAMS

There will now be described with particular reference to FIG. 7 the execution of a program entailing changing from a main program to two programs and the subsequent re-entry into the main program. It is assumed that said programs are available recorded on two partialized cards forming part of a library of subprograms.

Figure 7:
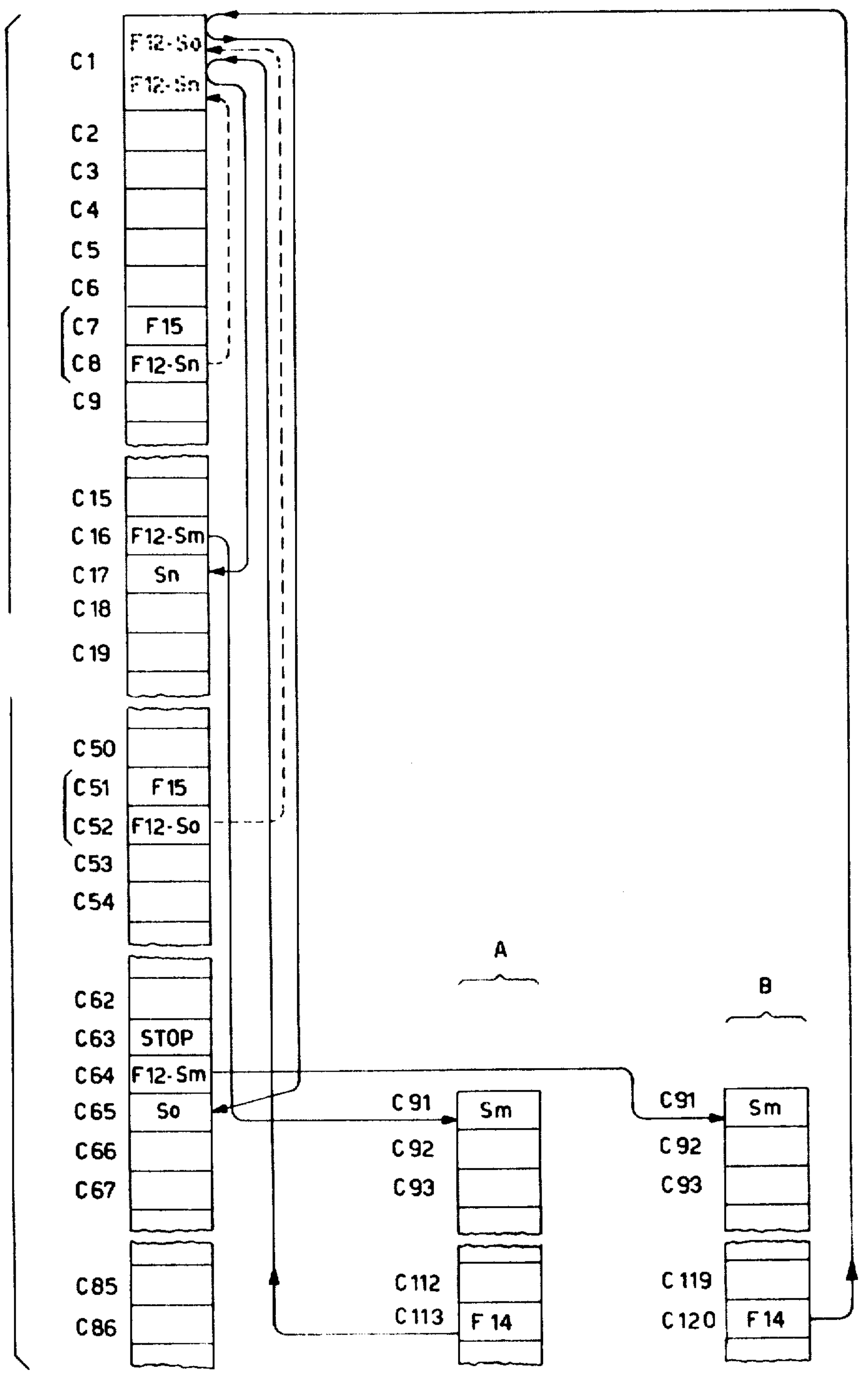
FIG. 7 is a flow diagram of the execution of the instructions of a main program and of two different subprograms in the computer according to the invention.

More particularly, FIG. 7 relates to a main program which is assumed to have been introduced into the instruction registers of the store either from the keyboard, or through the reading of a card, for example a magnetic card, containing said main program.

This main program comprises 85 instructions which are assumed to be allocated to the decimal places or storage locations C2 to C86 of said instruction registers.

Thereafter, by depressing the relevant card partialization key SP and operator in the manner described in the preceding chapter "Program Cards," the recording of the first subprogram A in the two appropriate registers D and E is effected, which registers, as already described in the aforesaid chapter "Program Cards," are the only ones concerned in the phases of recording and reading the partialized cards.

It is assumed that said subprogram A comprises 23 instructions and that these are allocated to the places or storage locations C91 to C113 of the instruction registers of the store LDR.

After the main program and the subprogram A have been entered in the store registers and the computer has been prearranged for automatic execution by depressing the key AUT, the computer interprets and executes the instruction contained in the first place C1 which, as already described in the chapter "Changing From The Main Program To A Subprogram And Vice Versa," does not contain a significant program instruction.

The execution phase of this instruction having been completed, the following instruction contained in the place C2 is automatically extracted and executed, and a similar procedure is followed with the successive instructions contained in the places C3 to C6.

Thereafter, the instruction contained in the place C7 is extracted and interpreted, this instruction being assumed to be constituted by the first character F15 of the two-character instruction F15·(F12·Sn) of the type described in the chapter "Interpretation And Execution Of An Instruction Of The Second Format" and being adapted to prearrange the re-entry from the subprogram into the main program in the desired decimal place.

In the phases of interpretation and execution of said instruction, which have been described in the aforesaid chapter on Second Format Instructions with reference to a generic instruction of this particular type, the computer substitutes the second character of the present instruction, F12·Sn, which is contained in the place C8, for the contents of the first store place C1.

As hereinbefore described, F12 represents the jump function and Sn represents the address at which the jump ends.

The machine then continues the execution of the program and interprets and executes the following instructions contained in the places C9 to C15. Following this, the computer goes on to interpret the instruction contained in the place C16. It is assumed that this is a jump instruction F12·Sm, which, in accordance with the methods of execution described in the above-mentioned U.S. Pat. 3,469,244 (see col. 29 "-Jump") causes the jump to be effected to the address Sm representing the reference code which has been placed at the beginning of the subprogram A in the place C91 preceding the place C92 in which the first significant instruction of said subprogram is located.

The computer now goes on to interpret an execute said first significant instruction of the subprogram located in the place C92 and continues thereafter to process the other instructions of the subprogram; the last instruction of the subprogram is an instruction F14 (third format), which imposes on the computer a jump to the first instruction contained in the first place C1 of the program registers.

As has been said, this last instruction is a jump instruction F12·Sn which, duly interpreted and executed, produces the jump to the address register Sn, which distinguishes the instruction of the main program from which the execution of said main program must be resumed. Assuming that the reference code corresponding to the jump address Sn has been prearranged in the place C17, the execution of the main program will be resumed starting from the instruction contained in the place C18.

The machine then continues to execute the program, interpreting and executing the instructions contained in the places C19 to C50.

Thereafter, the computer extracts and interprets the instruction contained in the place C51. This instruction is assumed to be constituted by the first character F15 of another two-character instruction F15·(F12·So), which is to prearranged the re-entry from the second subprogram B at a preestablished point of the main program. The computer therefore provides for substituting the second character, F12·(So), of the present two-character instruction which is contained in the place C52, for the contents of the first store place C1. As hereinbefore described, F12 represents the jump function and So represents the address at which the jump ends. The machine then continues to execute the program, interpreting and executing the instructions contained in the places C53 to C62.

Thereafter, the machine automatically extracts the stop instruction for the operation of the electronic computer in the place C63.

The computer therefore interrupts its automatic operation and, after depressing the relevant partialization key SP, the operator prearranges the machine for reading the subprogram B recorded on the second partialized card. As already described hereinbefore, during the reading phase said subprogram contained in the partialized card is transferred to, and recorded in, the two appropriate registers D and E of the internal store LDR, thereby destroying the subprogram A previously recorded in the same registers D and E, without however destroying the main program previously entered in said store LDR. It is assumed that the instructions contained in said second subprogram B are transferred to the decimal places C91 to C120 of the store. This manual operation of introducing the partialized card into the reader having been carried out and said subprogram B having been recorded in this way in the registers D and E and being thus immediately available, the operator by pressing the start key on the keyboard, re-starts the automatic operation of the machine, which extracts and interprets the instruction immediately following the stop instruction contained, as has been seen, in the place C63 of the store: the machine therefore extracts the instruction contained in C64.

This instruction is assumed to be the jump instruction F12·Sm which, in manner which is well-known by now, produces the jump to the address Sm is contained in the place C91 of the program registers.

The computer therefore abandons the processing of the main program and sets itself in the condition to initiate the execution of said subprogram by the methods hereinbefore described.

More precisely, the computer interprets and executes the first significant instruction of the subprogram B which is located in the place C92 and thereafter executes the other instructions contained in the places C93 to C119.

The final instruction of said subprogram B, which is located, as assumed, in the place C120, is an instruction F14 of the third format and, as already described imposes on the computer a jump to the instruction contained in the first place C1 of the program registers.

This final instruction is now a jump instruction F12·So adapted to prearrange the re-entry into the main program at the preestablished point and, being interpreted and executed, imposes on the machine the jump to the jump address Sc.

Assuming that the reference code corresponding to this jump address has been prearranged in the place C65, the execution of the main program will be resumed starting from the instruction contained in the place C66 and will continue thereafter with the processing of the other instructions of said main program until the last instruction has been interpreted and executed, this being assumed to be contained in the place C86 of the program registers.

I claim:

1. In a mini-computer, an improved linkage arrangement between a main program and a subprogram comprising:

means for executing instructions stored in a consecutive series of storage locations;

means for reading a manually insertable record member adapted to contain a complete multi-instruction subprogram;

program storage means for storing a main program and a subprogram, said storing means including a first portion permitted to subprograms read from successive record members presented to said reading means, and a second portion, forbidden to said subprograms, containing a main program, said main program containing a first plurality of instructions to be executed prior to the execution of said subprogram and a second plurality of instructions to be executed subsequent to the execution of said subprogram, said first plurality of instructions further including a special transfer instruction and a variable jump instruction to jump to the initial instruction of said second plurality of instructions, said variable jump instruction being located in the storage location immediately following the location of said special transfer instruction;

special instruction transfer means, responsive to said special transfer instruction, for transferring the instruction found in the location immediately following the location of said special transfer instruction to a predesignated location, said special instruction transfer means operating independently of programmable software addressing;

means, connected to said reading means, for entering each of said subprograms into said permitted portion, said entering means directing said subprogram to said permitted portion automatically and independently of addressing information contained on said record member, the last instruction of each subprogram being a special jump instruction which does not have a variable operand;

jumping means operative to transfer computer control to the instruction located at a destination location, said destination location being determined by the designation contained in the operand of said variable jump instructions, said jumping means including special jumping means operative to transfer computer control only to the instruction located at said predesignated location, said special jumping means only operative in response to said special jump instruction which has no variable operand.

2. In a desk top data processing arrangement having means for executing instructions stored in a consecutive series of storage locations, a linkage system between a main program and a subprogram comprising:

jump means for causing computer control to be transferred to an instruction location at a destination location in response to a variable jump instruction, the operand of said variable jump instruction identifying the instruction at said destination location;

a program storage means which includes said series of locations and which further includes a special, hardware-addressed, destination location;

transfer means, operative upon the sensing of a special transfer instruction which has no operand, to transfer one of said variable jump instructions to said special, hardware-addressed, destination location;

said jump means including means, operative upon the sensing of a special jump instruction which has no operand, to cause computer control to be transferred to the instruction located at said special, hardware-addressed, destination location, said instruction located at said special destination location being a variable jump instruction 3. In a computer including means for storing instructions in a plurality of locations, means for executing instructions stored in a consecutive series of storage locations, means for writing instructions into said storage locations, and means for reading instructions from said storage locations, an improvement to facilitate subprogram linkage comprising:

special information transfer means, operative in response to a special data transfer instruction, for transferring the instruction contained in a first location to a second, predesignated location, said first and second locations being determined independently of software addressing with said first location being fixed relative to the location of said special data transfer instruction;

first jump means operative to transfer computer control to the instruction located at a destination location, said destination location being determined by the designation contained in the operand of a variable jump instruction, said first jump means including special jump means operative to transfer computer control only to the instruction located at said predesignated location, said special jump means only operative in response to said special jump instruction which has no variable operand;

said special transfer means and said special jump means both utilizing said predesignated location as a destination location, said special transfer means and said special jump means both operating on said fixed location independently of programmable software addressing.

4. A desk top programmable data processing system having means for executing instructions stored in a consecutive series of storage locations contained on a plurality of manually insertable subprogram cards, each having a multi-instruction subprogram thereon and each having identical final operative instructions thereon, said identical final instructions being special jump instructions, the entire content of said special jump instructions being invariable, said data processing system comprising:

a program store having a consecutive series of storage locations and having a portion permitted to said subprograms contained on said cards and a portion forbidden to said subprograms, said forbidden portion containing a main program, which main program comprises a first plurality of consecutively located instructions and a second plurality of consecutively located instructions, the last instruction of said first plurality being an instruction to jump to said permitted portion, said first plurality including a special transfer instruction having its entire format permanently fixed and a variable jump instruction with a variable operand designating the first operative instruction of said second plurality of instructions as the destination location of said variable jump instruction;

means for entering each of the subprograms from said cards into said permitted portion, said means for entering automatically directing said subprograms to said permitted portion independently of any software addressing;

special transfer means, operative in response to said special transfer instruction, to transfer said variable jump instruction to a reserved predesignated location, said special transfer means carrying out said transfer independently of software addressing;

first jump means operative to transfer computer control to the instruction located at a destination location, said destination location being determined by the designation contained in the operand of a variable jump instruction, said first jump means including special jump means operative to transfer computer control only to the instruction located at said predesignated location, said special jump means only operative in response to said special jump instruction which has no variable operand.

* * * * *